(12) United States Patent
Ren et al.

(10) Patent No.: US 12,008,803 B2
(45) Date of Patent: Jun. 11, 2024

(54) NEURAL NETWORK TRAINING METHOD AND APPARATUS FOR IMAGE RETRIEVAL, AND ELECTRONIC DEVICE

(71) Applicant: UISEE TECHNOLOGIES (ZHEJIANG) LTD., Jiaxing (CN)

(72) Inventors: Hao Ren, Nanjing (CN); Siyang Li, Nanjing (CN); Hong Lu, Nanjing (CN)

(73) Assignee: UISEE TECHNOLOGIES (ZHEJIANG) LTD., Jiaxing (CN)

( * ) Notice: Subject to any disclaimer, the term of this patent is extended or adjusted under 35 U.S.C. 154(b) by 0 days.

(21) Appl. No.: 18/020,946

(22) PCT Filed: Aug. 25, 2020

(86) PCT No.: PCT/CN2020/111121
§ 371 (c)(1),
(2) Date: Jun. 9, 2023

(87) PCT Pub. No.: WO2022/032725
PCT Pub. Date: Feb. 17, 2022

(65) Prior Publication Data
US 2023/0298334 A1 Sep. 21, 2023

(30) Foreign Application Priority Data

Aug. 13, 2020 (CN) .......................... 202010813927.2

(51) Int. Cl.
*G06V 10/82* (2022.01)
*G06V 10/44* (2022.01)

(52) U.S. Cl.
CPC .............. *G06V 10/82* (2022.01); *G06V 10/44* (2022.01)

(58) Field of Classification Search
CPC .... G06V 10/82; G06V 10/764; G06V 40/172; G06V 10/454; G06V 10/7747
See application file for complete search history.

(56) References Cited

U.S. PATENT DOCUMENTS

2019/0377930 A1    12/2019 Chen et al.

FOREIGN PATENT DOCUMENTS

| CN | 107092661 A | 8/2017 |
|---|---|---|
| CN | 108021947 A | 5/2018 |

(Continued)

OTHER PUBLICATIONS

Opitz et al., "BIER—Boosting Independent Embeddings Robustly," 2017 IEEE International Conference on Computer Vision (ICCV), Venice, Italy, 2017, pp. 5199-5208, doi: 10.1109/ICCV.2017.555. (Year: 2017).*

(Continued)

*Primary Examiner* — Ross Varndell
(74) *Attorney, Agent, or Firm* — Bayramoglu Law Offices LLC

(57) ABSTRACT

A neural network training method and apparatus for image retrieval, and an electronic device are provided. A neural network includes: one feature extractor and a plurality of learners. The method includes: for each training image group, inputting three images of the training image group into the feature extractor, and determining features of the three images; for each image in each training image group, respectively multiplying the features of the image by a random weight corresponding to each learner, so as to obtain weighted features corresponding to each learner; for each image in each training image group, inputting the weighted features of the image corresponding to each learner into the corresponding learner, and determining a plurality of feature vectors of the image; and adjusting parameters of the neural network on based on the plurality of feature vectors of each image in a plurality of training image groups.

16 Claims, 5 Drawing Sheets

(56) References Cited

FOREIGN PATENT DOCUMENTS

| CN | 110688502 | A | | 1/2020 | | |
|---|---|---|---|---|---|---|
| CN | 111125396 | A | * | 5/2020 | ........... | G06F 16/532 |
| CN | 111125396 | A | | 5/2020 | | |
| CN | 111242162 | A | | 6/2020 | | |

OTHER PUBLICATIONS

Song et al., "Deep Metric Learning via Lifted Structured Feature Embedding," In Proc. CVPR, 2016. (Year: 2016).*

Bishop, Christopher M. (1995). Regularization and complexity control in feed-forward networks. In: Proceedings International Conference on Artificial Neural Networks ICANN'95. EC2 et Cie. (Unpublished) (Year: 1995).*

* cited by examiner

NEURAL NETWORK TRAINING METHOD AND APPARATUS FOR IMAGE RETRIEVAL, AND ELECTRONIC DEVICE

CROSS REFERENCE TO THE RELATED APPLICATIONS

This application is the national phase entry of International Application No. PCT/CN2020/111121, filed on Aug. 25, 2020, which is based upon and claims priority to Chinese Patent Application No. 202010813927.2, filed on Aug. 13, 2020, the entire contents of which are incorporated herein by reference.

TECHNICAL FIELD

The present application relates the field of image processing technologies, and particularly to a neural network training method and apparatus for image retrieval, and an electronic device.

BACKGROUND

With the development of Internet economy, the demand for searching images according to images is increasing, and it is more and more important to realize an image retrieval technology of searching images according to images. Image retrieval is to, according to images to be retrieved, search the same category as images in a database, with a main purpose of recalling the same category as images in the database more accurately. For example, in intelligent driving (including unmanned driving and assisted driving), it is necessary to identify scenes corresponding to collected images, so as to make decisions for current scenes.

Existing image retrieval technologies are mainly based on a multi-branch (which is namely a learner) network model of a convolutional neural network, which maps information features of different attributes in an image into embedded feature vectors through different network branches, then describes a spatial position of one image under a distance measurement level on the basis of these embedded feature vectors, and then finds similar images through spatial positions of different images.

The above multi-branch network model is obtained by performing differential model training on multiple branches, and samples of the model training take a triplet composed of three images as the smallest unit, in which one image is an image A to be retrieved, and the other two images are an image P of the same category as the image A and an image N of the different category from the image A. With reference to FIG. 1, taking a multi-branch network model containing three branches (learners) as an example, a main process of a serialization training method for the multi-branch network model includes: inputting the image A in the triplet into three convolutional neural networks CNNs respectively, and extracting features of the image by the three CNNs respectively; then, inputting the features extracted by the three CNNs into corresponding learner 1, learner 2 and learner 3 respectively, so as to obtain three feature vectors corresponding to the image; for the image P and the image N, executing the same operation, so as to obtain three feature vectors corresponding to the image P and the image N respectively; then, on the basis of the goal that the image A and the image P are similar (in a small distance), but the image A and the image N are not similar (in a large distance), calculating a loss value of each branch in sequence by utilizing a Triplet Loss function according to the categories of the three images and the three feature vectors corresponding to each image, and propagating the loss value back to adjust weights of the learners and the CNNs of the branches, in which the loss value of the previous branch may affect the weight adjustment of the next branch, thus differentiating the branches to acquire a capability of mapping different attributes of images.

The main problems of the above multi-branch network model and the serialization training method thereof are that: (1) information errors on some branches may be accumulated to the later branches, resulting in branch performance loss and even network over-fitting; (2) a branch with a poor training effect may affect performances of other branches and even the whole model; and (3) for to information differences among different triplets, since different branches have different sensitivities to the same attribute, some branches cannot map a certain attribute well, and even affect a performance of a feature extractor in back propagation.

SUMMARY

In order to solve the above technical problems or at least partially solve the above technical problems, the present application provides a neural network training method and apparatus for image retrieval, and an electronic device.

In a first aspect, the present application provides a neural network training method for image retrieval, wherein a neural network includes: one feature extractor and a plurality of learners, and the plurality of learners share features extracted by the one feature extractor; a plurality of training image groups are predetermined, and each training image group includes three images, wherein two images are of the same category and one image is of a different category; and the method includes:

for each training image group, assigning a random weight to each learner:

inputting the three images of the training image group into the feature extractor, and determining features of the three images;

for each image, respectively multiplying the features of the image by the random weight corresponding to each learner, so as to obtain weighted features of the image corresponding to each learner; and for each learner, making the three images in the training image group correspond to the same random weight;

for each image, inputting the weighted features of the image corresponding to each learner into the corresponding learner, and determining a plurality of feature vectors of the image; and adjusting parameters of the neural network on the basis of the plurality of feature vectors of each image in each training image group of the plurality of training image groups.

In a second aspect, the present application provides a neural network training apparatus for image retrieval, wherein a neural network includes: one feature extractor and a plurality of learners, and the plurality of learners share features extracted by the one feature extractor; the apparatus predetermines a plurality of training image groups, and each training image group includes three images, wherein two images are of the same category and one image is of a different category; for each training image group, a random weight is assigned to each learner; and the apparatus includes:

an extracting unit configured for, for each training image group, inputting the three images of the training image group into the feature extractor, and determining features of the three images;

a weighting unit configured for, for each training image group and for each image, respectively multiplying the features of the image by the random weight corresponding to each learner, so as to obtain weighted features of the image corresponding to each learner; and for each learner, making the three images in the training image group correspond to the same random weight;

a mapping unit configured for, for each training image group and for each image, inputting the weighted features of the image corresponding to each learner into the corresponding learner, and determining a plurality of feature vectors of the image; and an adjusting unit configured for adjusting parameters of the neural network on the basis of the plurality of feature vectors of each image in each training image group of the plurality of training image groups.

In a third aspect, the present application provides an electronic device, including: a processor and a storage; wherein the processor is used for executing the steps of the neural network training method for image retrieval above in any one of embodiments by calling a program or an instruction stored in the storage.

In a fourth aspect, the present application provides a non-transient computer-readable storage medium, wherein the non-transient computer-readable storage medium stores a program or an instruction, and the program or the instruction enables a computer to execute the steps of the neural network training method for image retrieval above in any one of embodiments.

Compared with the prior art, the technical solution provided by the embodiments of the present application has the following advantages:

I. The learners share the features extracted by the feature extractor, thus improving an independence of branches, weakening an influence of previous branches on later branches, and optimizing an over-fitting problem of network.

II. The random weight is added for each learner, thus optimizing an adaptability of multiple branches to an information difference between training data, weakening a persistent influence of the information difference between training data on some branches and an influence of branches with a poor performance on the overall model, and improving a robustness of the model.

BRIEF DESCRIPTION OF THE DRAWINGS

The drawings herein are incorporated into the specification and constitute a part of the specification, show embodiments that conform to the present application, and are used for describing a principle of the present application together with the specification.

In order to illustrate the embodiments of the present application or the technical solution in the prior art more clearly, the drawings needed to be used in the description of the embodiments or the prior art will be briefly introduced hereinafter. Obviously, for those of ordinary skills in the art, other drawings may also be obtained according to these drawings without going through creative works.

DETAILED DESCRIPTION OF THE EMBODIMENTS

In order to understand the above objects, features and advantages of the present application more clearly, the solution of the present application will be further described hereinafter. It should be noted that, in the case of no conflict, embodiments of the present application and features in the embodiments may be combined with each other.

Many specific details are explained in the following description to facilitate fully understanding the present application, but the present application may also be implemented in other ways different from those described herein. Obviously, the embodiments in the specification are only a part of embodiments but not all of embodiments of the present application.

At present, for a multi-branch network model for image retrieval on the basis of a serialization training method, due to information differences between branches and different triplets in serialization and differentiation learning, there are problems that information errors of previous branches are accumulated to later branches, and some branches incapable of mapping some attributes well affect a performance of the whole model, and even affect a performance of a feature extractor in back propagation. For the problems, an embodiment of the present application provides a neural network training solution for image retrieval. Firstly, a plurality of learners share features extracted by the same feature extractor, thus improving an independence of the branches, weakening an influence of the previous branches on the later branches and an influence on the feature extractor in back propagation, and optimizing an over-fitting problem of network. Secondly, a random weight is added for each learner in the network, and one random weight is reassigned for each learner every time one training image group is changed, while the random weight corresponding to each learner remains unchanged in a process of processing three images of the same training image group, so as to ensure an invariance of a neural network processing the three images of the same training image group, and meanwhile, a random influence of feature information of each training image group in neural network training is increased, thus, on the basis of ensuring correct training of the neural network, weakening a persistent influence of information differences between different training image groups on some branches, and influences of accumulation of the information errors of the branches and branches with a poor performance on the overall model, and improving a robustness of the model.

Figure 1:
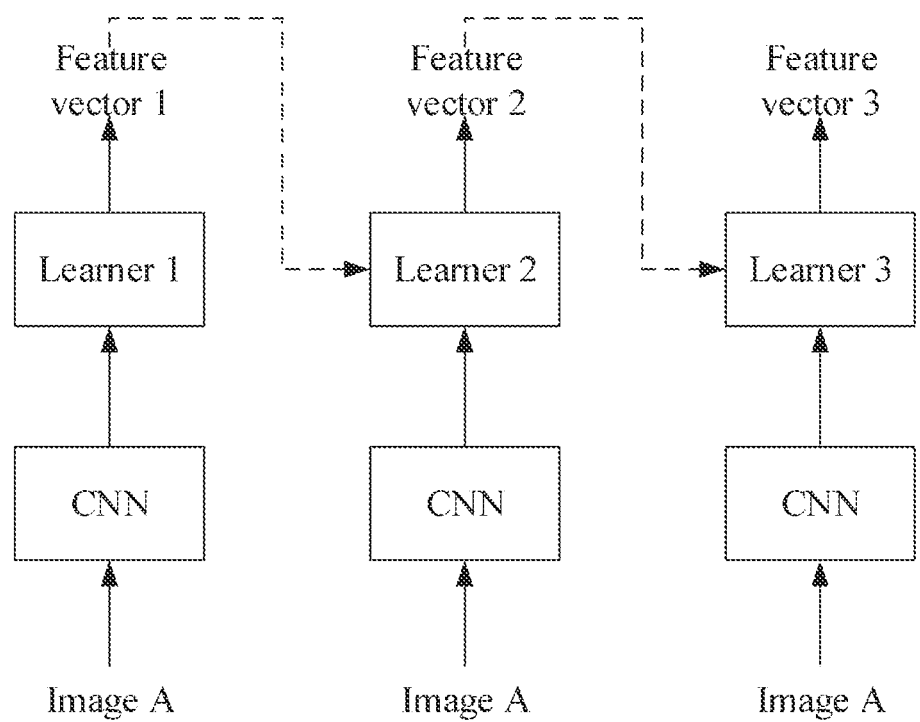
FIG. 1 is a network structure block diagram of a neural network for image retrieval in the prior art.
Figure 2:
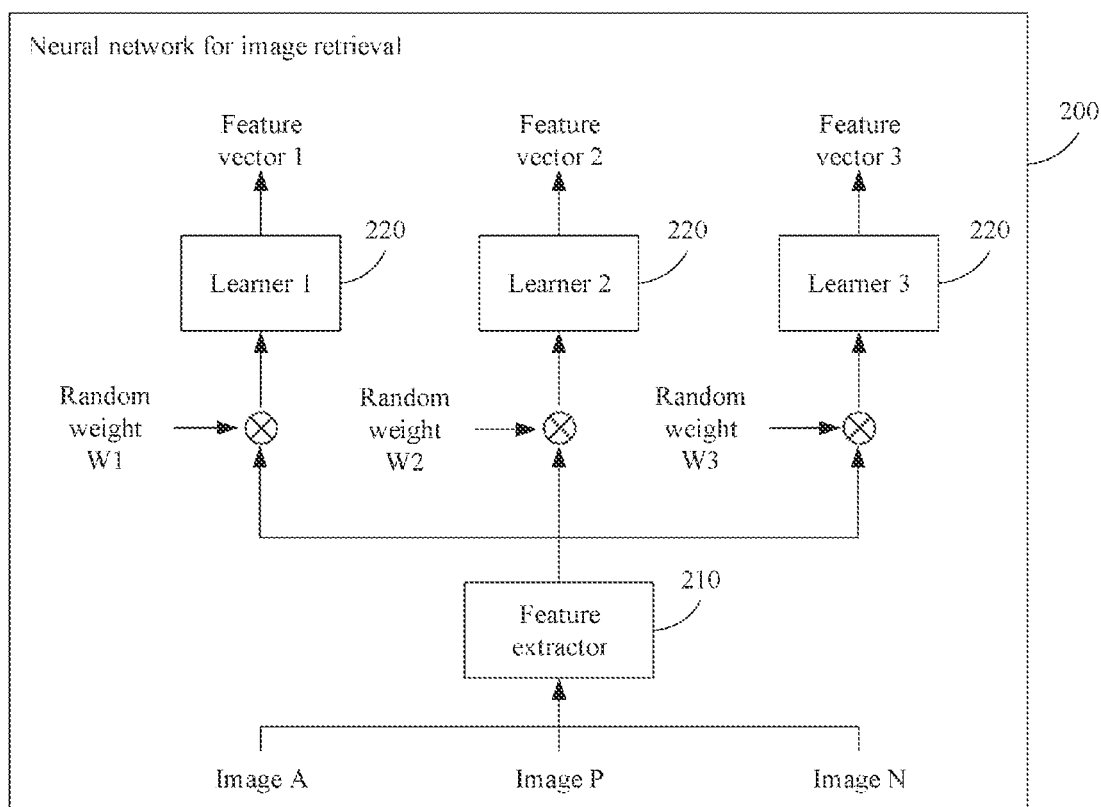
FIG. 2 is a network structure block diagram of a neural network for image retrieval provided by an embodiment of the present application.

The neural network training solution for image retrieval provided by the embodiment of the present application is applicable to application scenes depending on image retrieval. FIG. 2 is a network structure block diagram of a neural network for image retrieval provided by an embodiment of the present application. As shown in FIG. 2, the neural network 200 for image retrieval includes, but is not limited to: one feature extractor 210 and a plurality of learners 220. An input of the neural network 200 for image retrieval in a training process is a training image group, and each training image group includes three images, wherein two images are of the same category, such as an image A and an image P, and another image is of a different category distinguished from the above-mentioned category, such as an image N.

The feature extractor 210 is used for extracting features of an input image, so as to obtain the features of the image. In some embodiments, the feature extractor 210 may be a convolutional neural network CNN.

The learner 220 is used for mapping the features extracted by the feature extractor 210 into a feature vector. At least two learners 220 are provided, and three learners are taken as an example in FIG. 2. The plurality of learners 220 share the features extracted by the feature extractor 210, which means that the input of each learner 220 is the features extracted by the feature extractor 210. An output of each learner 220 is one feature vector. Then, for one input image, the obtained feature vector and the learner 220 are consistent in number. In some embodiments, a fully connected layer may be added behind the plurality of learners 220 for mapping a plurality of feature vectors into one embedded feature vector.

In some embodiments, in order to weaken an influence of information differences between different training image groups on a training effect of the branches, one random weight Wi is applied between the feature extractor 210 and each learner 220, and a value of Wi is between 0 and 1, which means that 0<Wi<1. In some embodiments, Wi may be generated by a random number generator. The random weight Wi and the learner 220 are consistent in number. As shown in FIG. 2, three random weights W1, W2 and W3 are applied for further processing the features extracted by the feature extractor 210, so as to add random information to the features. In some embodiments, the random weight may be processed by multiplying the extracted features by the random weight corresponding to each learner 220, so as to obtain weighted features corresponding to each learner 220. In some embodiments, for the three images in the same training image group, the random weight corresponding to each learner 220 is the same. However, for different training image groups, it is necessary to reassign the random weight to each learner 220. That is, a group of random weights Wi is randomly assigned for each training image group, and the group of random weights Wi remains unchanged in a training process of the corresponding training image group.

In some embodiments, the feature extractor 210 and each learner 220 may be integrated in the same electronic device. In some embodiments, the feature extractor 210 and each learner 220 may be distributed in at least two electronic devices, which are in communication connection with each other for transmitting processing data between different network structures. The above electronic device may be a device with a large-amount computing function, such as a notebook computer, a desktop computer, a server or a service cluster.

Figure 3:
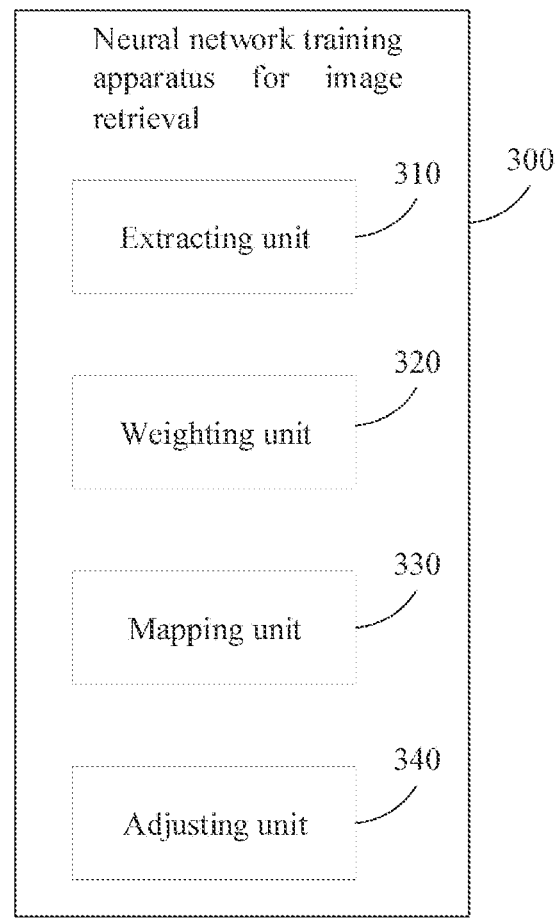
FIG. 3 is a network structure block diagram of a neural network training apparatus for image retrieval provided by an embodiment of the present application.

FIG. 3 is a network structure block diagram of a neural network training apparatus for image retrieval provided by an embodiment of the present application. The neural network training apparatus 300 for image retrieval is used for training the neural network for image retrieval in FIG. 2. In some embodiments, the neural network training apparatus 300 for image retrieval simultaneously trains the feature extractor 210 and the plurality of learners 220 to obtain various model parameters, instead of separately training the feature extractor 210 and the learners 220.

In some embodiments, the neural network training apparatus 300 for image retrieval predetermines a plurality of training image groups, and each training image group includes three images, wherein two images are of the same category and one image is of a different category. Specifically, for one network training, the neural network training apparatus 300 for image retrieval needs to predetermine the plurality of training image groups, and each training image group includes the three images, wherein two images are of the same category, such as an image A and an image P, and another image is of a different category distinguished from the above-mentioned category, such as an image N. For example, 10 training image groups are predetermined, and each training image group contains the three images, with a total of 30 training sample images.

In some embodiments, a process for the neural network training apparatus 300 for image retrieval to predetermine the plurality of training image groups may be as follows: a training sample set is acquired, wherein the training sample set includes a plurality of categories of images, and each category includes at least two images; and Then, a plurality of reference images A are selected from the training sample set, wherein the reference image A is used as an image to be retrieved. Meanwhile, for each reference image A, the image P of the same category as the reference image A and the image N of the different category from the reference image A are selected from the training sample set. In this way, the plurality of training image groups may be obtained, and the training image group and the reference image A are consistent in number.

In some embodiments, the neural network training apparatus 300 for image retrieval also needs to assign a random weight to each learner for each training image group in advance in addition to predetermining the plurality of image training groups. In some embodiments, after training once, the neural network training apparatus 300 for image retrieval may re-determine the plurality of training image groups from the training sample set for the next network training. In one network training process, each training image group may be input into the network for training, and every time one training image group is changed, random weights may also be reassigned to the learners, so as to further improve a randomness of processing of extracted features in the network training process, thus further weakening the influence of the information differences between different training image groups on the branches.

As shown in FIG. 3, the neural network training apparatus 300 for image retrieval includes, but is not limited to, the following units: an extracting unit 310, a weighting unit 320, a mapping unit 330 and an adjusting unit 340. In one network training process, the extracting unit 310, the weighting unit 320 and the mapping unit 330 are repeatedly executed, one of the plurality of training image groups is processed in each execution, while the adjusting unit 340 is executed once. The units are specifically described as follows:

The extracting unit 310 is configured for, for each training image group, inputting the three images of the training image group into the feature extractor, and determining features of the three images. In one network training process, the extracting unit 310 performs a feature extraction operation on each training image group respectively. In specific implementation, the feature extracting unit 310 inputs one training image group into the feature extractor at a time; and after being processed by the feature extractor, three extracted features corresponding to the three images in the corresponding training image group are obtained.

The weighting unit 320 is configured for, for each image in each training image group, respectively multiplying the features of the image by the random weight corresponding to each learner, so as to obtain weighted features of the image corresponding to each learner. Wherein, for each learner, the three images in the training image group correspond to the same random weight. In one network training process, the weighting unit 320 performs a feature weighting operation on each training image group respectively. In specific implementation, for a certain training image group, the weighting unit 320 respectively multiplies the features of each image in the training image group by the random weight corresponding to each learner, so as to obtain weighted features of the corresponding image corresponding to each learner. In some embodiments, taking the network structure in FIG. 2 as an example, the features of the image A are respectively multiplied by random weights W1, W2 and W3, so as to obtain three weighted features of the image A corresponding to a learner 1, a learner 2 and a learner 3. Similarly, three weighted features of the image P corresponding to the learner 1, the learner 2 and the learner 3, and three weighted features of the image N corresponding to the learner 1, the learner 2 and the learner 3 may be obtained. According to the above process, the weighted features of the three images in each training image group corresponding to the learners may be obtained. In the embodiment, for the convenience of understanding, the processing of the three images is described separately. In some embodiments, the three images in the training image group may be combined for processing.

The mapping unit 330 is configured for, for each training image group and for each image, inputting the weighted features of the image corresponding to each learner into the corresponding learner, and determining a plurality of feature vectors of the image. In one network training process, the mapping unit 330 performs a feature mapping operation on each training image group respectively, so as to obtain the plurality of feature vectors corresponding to the corresponding training image group. In specific implementation, there is a corresponding relationship between the weighted features and the learner, so that, for each image in a certain training image group, the mapping unit 330 inputs each weighted feature corresponding to the image into the corresponding learner, so as to obtain a feature vector corresponding to the corresponding weighted feature. In some embodiments, taking the network structure in FIG. 2 as an example, the mapping unit 330 inputs the three weighted features corresponding to the image A into the corresponding learner 1, learner 2 and learner 3 respectively, and after mapping processing by the learners, three feature vectors corresponding to the weighted features may be obtained. Similarly, three feature vectors corresponding to the image P and three feature vectors corresponding to the image N may be obtained. According to the above process, the plurality of feature vectors corresponding to the three images in each training image group may be obtained.

The adjusting unit 340 is configured for adjusting parameters of the neural network on the basis of the plurality of feature vectors of each image in each training image group of the plurality of training image groups. Each image in each training image group corresponds to the plurality of feature vectors, which may represent a spatial position of corresponding image under a distance measurement standard, and the spatial positions of the images may be used for representing a distance between any two images. The closer the distance is, the greater the probability that two images are of the same category is. Therefore, the adjusting unit 340 may calculate a loss function value of current training by utilizing the plurality of feature vectors of each image in each training image group of the plurality of training image groups, and then adjust the parameters of the neural network for image retrieval on the basis of the obtained loss function value.

In some embodiments, a process for the adjusting unit 340 to adjust the parameters of the neural network may be as follows: for each image in each training image group, the adjusting unit 340 inputs the plurality of feature vectors corresponding to the image into the fully connected layer, and after mapping processing by the fully connected layer, an embedded feature vector corresponding to the image is obtained. Then, each training image group corresponds to three embedded feature vectors. In this way, all the feature vectors may be mapped into the embedded feature vectors, which are used for representing the spatial positions of the images under the distance measurement standard. Taking FIG. 2 as an example, for one training image group, the image A, the image P and the image N all correspond to one embedded feature vector. Then, aiming at reducing a distance between the image A and the image P and increasing a distance between the image A and the image N, and taking the three embedded feature vectors corresponding to the three images in one training image group and the categories of the three images as data basis, the adjusting unit 340 calculates a loss function value of image retrieval for the three images in the training image group by utilizing a preselected loss function, such as a Triplet Loss function. In this way, one loss function value may be obtained on the basis of one training image group. According to this process, the adjusting unit 340 may obtain a plurality of loss function values on the basis of the plurality of training image groups. Then, an average value of the plurality of loss function values is calculated, so as to obtain an average loss function value corresponding to the plurality of training image groups. Finally, the parameters of the neural network for image retrieval may be adjusted by utilizing the average loss function value. Such arrangement has the advantage that, although the loss function value of one training image group contains an influence of the random weight, may be used for adjusting the parameters of the neural network, and weakens an influence of information differences between the three images on the neural network to a certain extent, the average loss function value contains influences of a plurality of groups of random weights corresponding to the plurality of training image groups, and can further synthesize the influences of the plurality of groups of random weights, thus further weakening the influence brought by the information differences between different training image groups.

In some embodiments, a process for the adjusting unit 340 to adjust the parameters of the neural network above on the basis of the average loss function value is as follows: the parameters of the neural network above are adjusted through back propagation on the basis of the average loss function value. The adjusting unit 340 adjusts parameters of the corresponding learner and one feature extractor through back propagation by utilizing the average loss function value of the neural network obtained in one training process. In some embodiments, the learner 1, the learner 2 and the learner 3 in FIG. 2 all correspond to a 128-bit embedded feature vector (which may be connected into one embedded feature vector, so as to facilitate hardware calculation) and one average loss function value. An average loss function may be directly propagated back to adjust the parameters of the corresponding learner. Therefore, from the perspective of back propagation of the learner, the branches are independent, which can weaken the influence of the previous and later branches. For parameter adjustment of CNN, the learner 1, the learner 2 and the learner 3 respectively have a gradient. For example, the learner 1 may be regarded as a series of operations. Taking y=a1x+b as an example, a gradient is a1 (which is namely a slope), and then an influence of parameter adjustment of CNN by back propagation of the learner 1 is 128*a1. In addition, gradients a2 and a3 of the learner 2 and the learner 3 are calculated respectively, and then an influence of parameter adjustment of CNN by back propagation of the average loss function value is 128*(a1+a2+a3).

Figure 4:
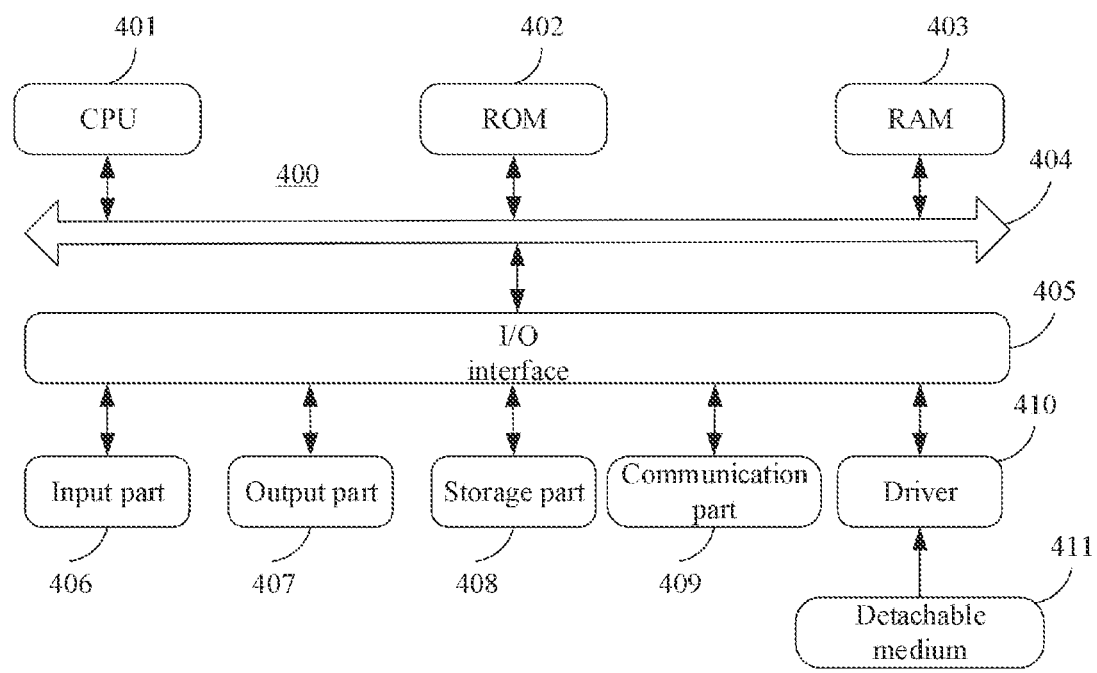
FIG. 4 is a schematic structural diagram of an electronic device provided by an embodiment of the present application.

FIG. 4 is a schematic structural diagram of an electronic device suitable for realizing the embodiments of the present application. As shown in FIG. 4, the electronic device 400 includes a central processing unit (CPU) 401, which may execute various processing in the above-mentioned embodiments according to a program stored in a read-only memory (ROM) 402 or a program loaded into a random access memory (RAM) 403 from a storage part 408. Various programs and data required for operation of the electronic device 400 are also stored in the RAM 403. The CPU 401, the ROM 402 and the RAM 403 are connected to each other through a bus 404. An input/output interface (I/O interface) 405 is also connected to the bus 404.

The following components are connected to the I/O interface 405: an input part 406 including a keyboard, a mouse, and the like, an output part 407 including a cathode ray tube (CRT), a liquid crystal display (LCD), a speaker, and the like; a storage part 408 including a hard disk and the like; and a communication part 409 including a network interface card, such as a LAN card, a modem, and the like. The communication part 409 executes communication processing through a network, such as the Internet. A driver 410 is also connected to the I/O interface 405 as needed. A detachable medium 411, such as a magnetic disk, an optical disk, a magneto-optical disk, a semiconductor storage, and the like, is mounted on the drive 410 as needed, so that a computer program read from the detachable medium may be conveniently mounted into the storage part 408 as needed.

In particular, according to the embodiment of the present application, the neural network training method for image retrieval described in the present application may be implemented as a computer software program. For example, the embodiment of the present application includes a computer program product, which includes a computer program tangibly contained in a readable medium thereof, and the computer program includes a program code for executing the neural network training method for image retrieval. In such embodiment, the computer program may be downloaded and mounted from the network through the communication part 409, and/or mounted from the detachable medium 411.

On the other hand, the present application further provides a non-transient computer-readable storage medium, which may be a computer-readable storage medium contained in the electronic device in the above embodiment; and may also be a computer-readable storage medium that exists alone and is not assembled into electronic device. The computer-readable storage medium stores one or more programs, which are used by one or more processors to execute a target detection method on the basis of an attention mechanism described in the present application.

Figure 5:
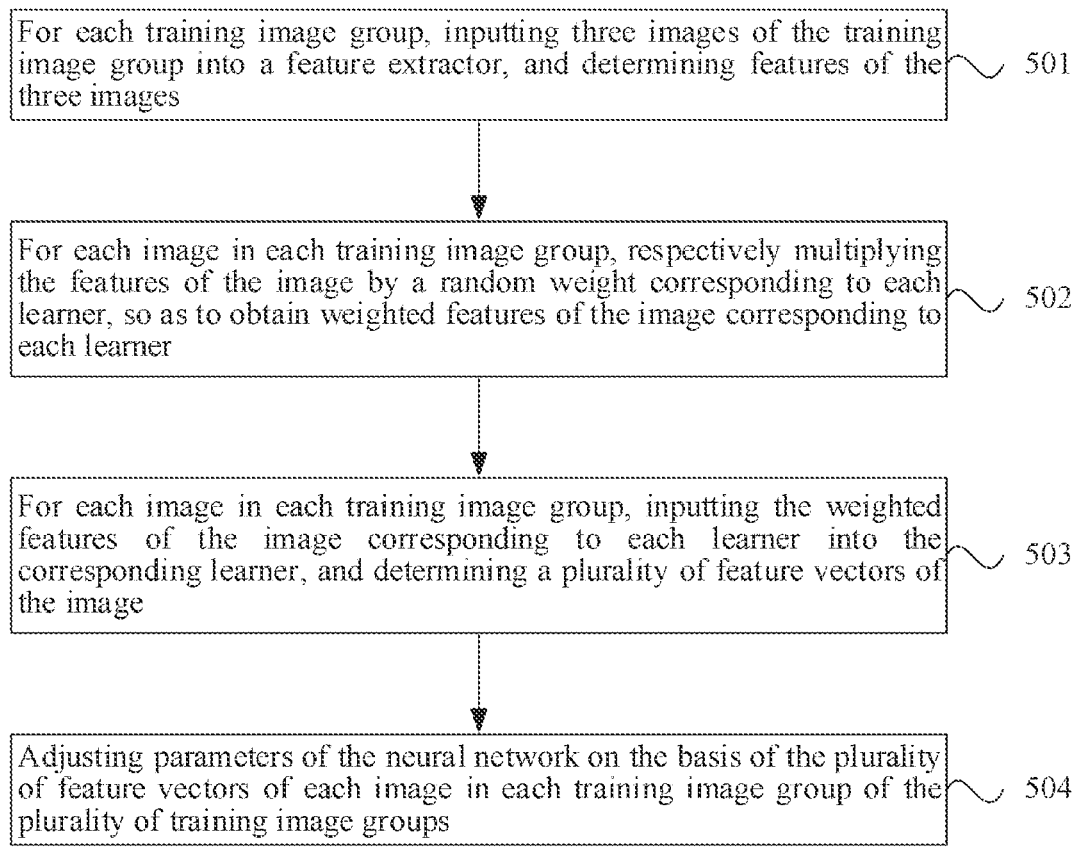
FIG. 5 is a flow chart of a neural network training method for image retrieval provided by an embodiment of the present application.

FIG. 5 is a flow chart of a neural network training method for image retrieval provided by an embodiment of the present application. In the method, a neural network includes: one feature extractor and a plurality of learners, and the plurality of learners share features extracted by the one feature extractor.

In some embodiments, in the method, a plurality of training image groups are predetermined, and each training image group includes three images, wherein two images are of the same category and one image is of a different category. Specifically, for one network training, the plurality of training image groups need to be predetermined, and each training image group includes the three images, wherein two images are of the same category, such as an image A and an image P, and another image is of a different category distinguished from the above-mentioned category, such as an image N. For example, 10 training image groups are predetermined, and each training image group contains the three images, with a total of 30 training sample images.

In some embodiments, the plurality of training image groups are predetermined, which includes: acquiring a training sample set, wherein the training sample set includes a plurality of categories of images, and each category includes at least two images; and determining a plurality of reference images A, an image P of the same category as each reference image A and an image N of a different category from each reference image A from the training sample set, so as to obtain the plurality of training image groups, wherein each training image group includes: the reference image A, the image P of the same category and the image N of the different category. Specifically, a training sample set is acquired first, wherein the training sample set should include a plurality of categories of images, and each category includes at least two images. Then, a plurality of reference images A are selected from the training sample set, wherein the reference image A is used as an image to be retrieved. Meanwhile, for each reference image A, the image P of the same category as the reference image A and the image N of the different category from the reference image A are selected from the training sample set. In this way, the plurality of training image groups may be obtained, and the training image group and the reference image A are consistent in number.

In some embodiments, it is also necessary to assign a random weight to each learner for each training image group in advance in addition to predetermining the plurality of image training groups. In some embodiments, after one training, the plurality of training image groups are re-determined from the training sample set for the next network training. In one network training process, each training image group may be input into the network for training, and every time one training image group is changed, random weights may also be reassigned to the learners, so as to further improve a randomness of processing of extracted features in the network training process, thus further weakening the influence of the information differences between different training image groups on the branches.

With reference to FIG. 5, the method includes the following steps 501 to 504.

In 501, for each training image group, the three images of the training image group are input into the feature extractor, and features of the three images are determined.

Specifically, in one network training process, a feature extraction operation is performed on each training image group respectively. In specific implementation, one training image group is input into the feature extractor at a time, and after processing by the feature extractor, three extracted features corresponding to the three images in the corresponding training image group are obtained.

In 502, for each image in each training image group, the features of the image are respectively multiplied by the random weight corresponding to each learner, so as to obtain weighted features of the image corresponding to each learner. Wherein, for each learner, the three images in the training image group correspond to the same random weight.

Specifically, in one network training process, a feature weighting operation is performed on each training image group respectively. In specific implementation, for a certain training image group, the features of each image in the training image group are respectively multiplied by the random weight corresponding to each learner, so as to obtain weighted features of the corresponding image corresponding to each learner. In some embodiments, taking the network structure in FIG. 2 as an example, the features of the image A are respectively multiplied by random weights W1, W2 and W3, so as to obtain three weighted features of the image A corresponding to a learner 1, a learner 2 and a learner 3. Similarly, three weighted features of the image P corresponding to the learner 1, the learner 2 and the learner 3, and three weighted features of the image N corresponding to the learner 1, the learner 2 and the learner 3 may be obtained. According to the above process, the weighted features of the three images in each training image group corresponding to the learners may be obtained. In the embodiment, for the convenience of understanding, the processing of the three images is described separately. In some embodiments, the three images in the training image group may be combined for processing.

In 503, for each image in each training image group, the weighted features of the image corresponding to each learner are input into the corresponding learner, and a plurality of feature vectors of the image are determined.

Specifically, in one network training process, a feature mapping operation is performed on each training image group respectively, so as to obtain the plurality of feature vectors corresponding to the corresponding training image group. In specific implementation, there is a corresponding relationship between the weighted features and the learner, so that, for each image in a certain training image group, each weighted feature corresponding to the image is input into the corresponding learner, so as to obtain a feature vector corresponding to the corresponding weighted feature. In some embodiments, taking the network structure in FIG. 2 as an example, the three weighted features corresponding to the image A are input into the corresponding learner 1, learner 2 and learner 3 respectively, and after mapping processing by the learners, three feature vectors corresponding to the weighted features may be obtained. Similarly, three feature vectors corresponding to the image P and three feature vectors corresponding to the image N may be obtained. According to the above process, the plurality of feature vectors corresponding to the three images in each training image group may be obtained.

In 504, parameters of the neural network are adjusted on the basis of the plurality of feature vectors of each image in each training image group of the plurality of training image groups.

Specifically, each image in each training image group corresponds to the plurality of feature vectors, which may represent a spatial position of corresponding image under a distance measurement standard, and the spatial positions of the images may be used for representing a distance between any two images. The closer the distance is, the greater the probability that two images are of the same category is. Therefore, a loss function value of current training may be calculated by utilizing the plurality of feature vectors of each image in each training image group of the plurality of training image groups, and then the parameters of the neural network for image retrieval are adjusted on the basis of the obtained loss function value.

Figure 6:
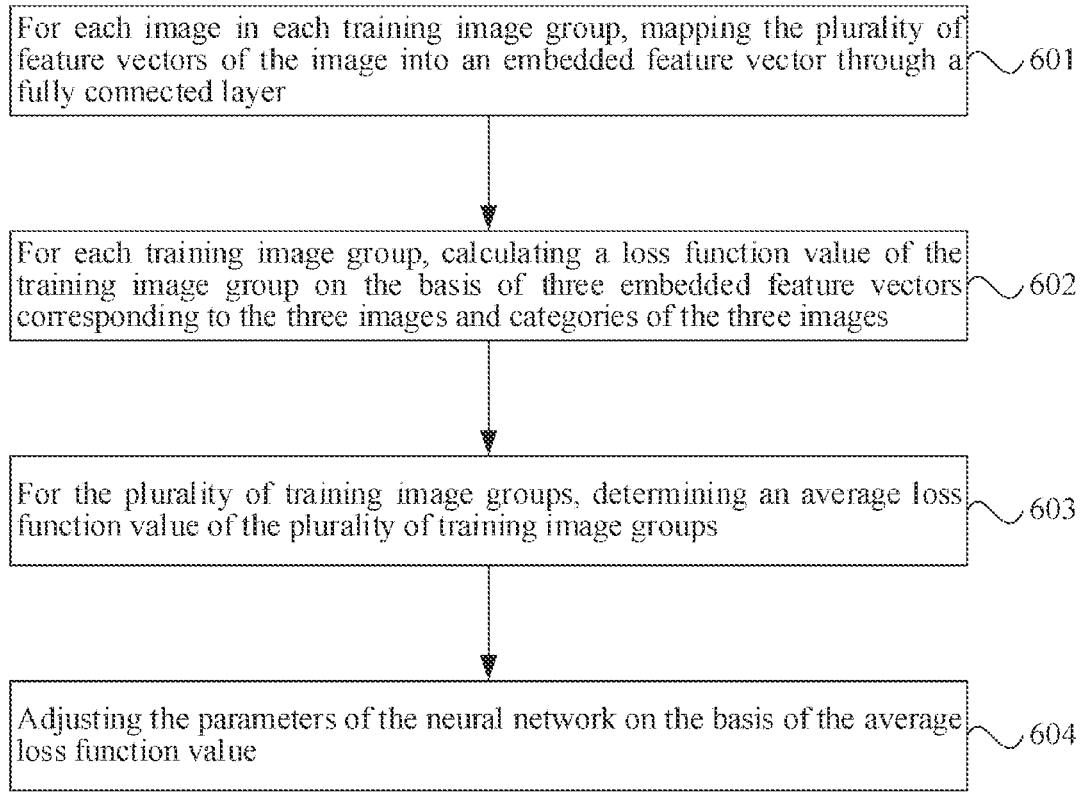
FIG. 6 is a flow chart of a parameter adjustment process in the neural network training method for image retrieval provided by the embodiment of the present application.

In some embodiments, with reference to FIG. 6, the step 504 includes the following steps 601 to 604.

In 601, for each image in each training image group, the plurality of feature vectors of the image are mapped into an embedded feature vector through a fully connected layer.

Specifically, for each image in each training image group, the plurality of feature vectors corresponding to the image are input into the fully connected layer, and after mapping processing by the fully connected layer, an embedded feature vector corresponding to the image is obtained. Then, each training image group corresponds to three embedded feature vectors. In this way, all the feature vectors may be mapped into the embedded feature vectors, which are used for representing the spatial positions of the images under the distance measurement standard. Taking FIG. 2 as an example, for one training image group, the image A, the image P and the image N all correspond to one embedded feature vector.

In 602, for each training image group, a loss function value of the training image group is calculated on the basis of three embedded feature vectors corresponding to the three images and categories of the three images.

specifically, aiming at reducing a distance between the image A and the image P and increasing a distance between the image A and the image N, and taking the three embedded feature vectors corresponding to the three images in one training image group and the categories of the three images as data basis, a loss function value of image retrieval for the three images in the training image group is calculated by utilizing a preselected loss function, such as a Triplet Loss function. In this way, one loss function value may be obtained on the basis of one training image group. According to this process, a plurality of loss function values may be obtained on the basis of the plurality of training image groups.

In 603, for the plurality of training image groups, an average loss function value of the plurality of training image groups is determined.

Specifically, an average value of the plurality of loss function values is calculated, so as to obtain an average loss function value corresponding to the plurality of training image groups.

In 604, the parameters of the neural network are adjusted on the basis of the average loss function value.

Specifically, the parameters of the neural network for image retrieval may be adjusted by utilizing the average loss function value. Such arrangement has the advantage that, although the loss function value of one training image group contains an influence of the random weight, may be used for adjusting the parameters of the neural network, and weakens an influence of information differences between the three images on the neural network to a certain extent, the average loss function value contains influences of a plurality of groups of random weights corresponding to the plurality of training image groups, and can further synthesize the influences of the plurality of groups of random weights, thus further weakening the influence brought by the information differences between different training image groups.

In some embodiments, the step 604 includes: adjusting the parameters of the neural network above through back propagation on the basis of the average loss function value. Specifically, parameters of the corresponding learner and one feature extractor are adjusted through back propagation by utilizing the average loss function value of the neural network obtained in one training process. In some embodiments, the learner 1, the learner 2 and the learner 3 in FIG. 2 all correspond to a 128-bit embedded feature vector (which may be connected into one embedded feature vector, so as to facilitate hardware calculation) and one average loss function value. An average loss function may be directly propagated back to adjust the parameters of the corresponding learner. Therefore, from the perspective of back propagation of the learner, the branches are independent, which can weaken the influence of the previous and later branches. For parameter adjustment of CNN, the learner 1, the learner 2 and the learner 3 respectively have a gradient. For example, the learner 1 may be regarded as a series of operations. Taking y=a1x+b as an example, a gradient is a1 (which is namely a slope), and then an influence of parameter adjustment of CNN by back propagation of the learner 1 is 128*a1. In addition, gradients a2 and a3 of the learner 2 and the learner 3 are calculated respectively, and then an influence of parameter adjustment of CNN by back propagation of the average loss function value is 128*(a1+a2+a3).

To sum up, in the neural network training method for image retrieval provided by the present application, the plurality of learners share features extracted by the same feature extractor, thus improving an independence of the branches, weakening an influence of the previous branches on the later branches and an influence on the feature extractor in back propagation, and optimizing an over-fitting problem of network. Moreover, the random weight is added for each learner in the network, and one random weight is reassigned for each learner every time one training image group is changed, while the random weight corresponding to each learner remains unchanged in a process of processing three images of the same training image group, so as to ensure an invariance of a neural network processing the three images of the same training image group, and meanwhile, a random influence of feature information of each training image group in neural network training is increased, thus, on the basis of ensuring correct training of the neural network, weakening a persistent influence of information differences between different training image groups on some branches, and influences of accumulation of the information errors of the branches and branches with a poor performance on the overall model, and improving a robustness of the model.

It should be noted that relational terms, such as "first" and "second", and the like, used herein are only intended to distinguish one entity or operation from another entity or operation, and do not necessarily require or imply that any such actual relationship or sequence exists between these entities or operations. Furthermore, the terms "comprise", "include", or any other variation thereof, are intended to cover a non-exclusive inclusion, so that a process, a method, an article, or equipment that includes a list of elements not only includes those elements but also includes other elements not expressly listed, or further includes elements inherent to such process, method, article, or equipment. In a case without further limitations, an element defined by the phrase "including one . . . " does not preclude the presence of additional identical elements in the process, method, article, or equipment that includes the element.

The flow chart and the block diagram in the drawings show system architectures, functions and operations that are possible to be implemented according to the apparatus, the method and the computer program product according to various embodiments of the present application. In this regard, each block in the flow chart or the block diagram may represent one module, one program segment, or a part of code. The module, the program segment, or the part of code contains one or more executable instructions for implementing specified logical functions. It should also be noted that in some alternative implementations, the functions noted in the blocks may also occur in a different order from those noted in the drawings. For example, two consecutively shown blocks may actually be executed in substantially parallel, and sometimes may be executed in a reverse order, depending on the functions involved. It should also be noted that each block in the block diagrams and/or the flow charts, and the combinations of the blocks in the block diagrams and/or flow charts, may be implemented with dedicated hardware-based systems that perform specified functions or operations, or may be implemented with the combinations of dedicated hardware and computer instructions.

The foregoing descriptions are only specific embodiments of the present application, so that those skilled in the art can understand or realize the present application. Many modifications to these embodiments will be obvious to those skilled in the art, and general principles defined herein may be realized in other embodiments without departing from the spirit or scope of the present application. Therefore, the present application will not be limited to these embodiments described herein, but should comply with the widest scope consistent with the principles and novel features applied herein.

INDUSTRIAL APPLICABILITY

In the present application, the learners share the features extracted by the feature extractor, thus improving an independence of the branches, weakening an influence of the previous branches on the later branches, and optimizing the over-fitting problem of network. In addition, the random weight is added for each learner, thus optimizing an adaptability of multiple branches to an information difference between training data, weakening a persistent influence of the information difference between training data on some branches and an influence of branches with a poor performance on the overall model, and improving a robustness of the model. Therefore, the industrial applicability is realized.

What is claimed is:

1. A neural network training method for an image retrieval, wherein a neural network comprises: one feature extractor and a plurality of learners, and the plurality of learners share features extracted by the one feature extractor; a plurality of training image groups are predetermined, and each training image group comprises three images, wherein two images are of the same category and one image is of a different category; and the method comprises:

for each training image group, assigning a random weight to each learner:
inputting the three images of the training image group into the feature extractor, and determining features of the three images;
for each image, respectively multiplying the features of the image by the random weight corresponding to each learner, so as to obtain weighted features of the image corresponding to each learner; and for each learner, making the three images in the training image group correspond to the same random weight;

for each image, inputting the weighted features of the image corresponding to each learner into the corresponding learner, and determining a plurality of feature vectors of the image; and adjusting parameters of the neural network based on the plurality of feature vectors of each image in each training image group of the plurality of training image groups;

wherein a different random weight is reassigned to each learner every time when one training image group is changed to another training image group, while the random weight corresponding to each learner remains unchanged in processing the three images of the same training image group.

2. The method according to claim 1, wherein the plurality of training image groups are predetermined, which comprises:

acquiring a training sample set, wherein the training sample set comprises a plurality of categories of images, and each category comprises at least two images; and determining a plurality of reference images A, an image P of the same category as each reference image A and an image N of a different category from each reference image A from the training sample set, so as to obtain the plurality of training image groups, wherein each training image group comprises: the reference image A, the image P of the same category and the image N of the different category.

3. The method according to claim 1, wherein the step of adjusting the parameters of the neural network based on the plurality of feature vectors of each image in each training image group of the plurality of training image groups, comprises:

for each image in each training image group, mapping the plurality of feature vectors of the image into an embedded feature vector through a fully connected layer;

for each training image group, calculating a loss function value of the training image group based on three embedded feature vectors corresponding to the three images and categories of the three images;

for the plurality of training image groups, determining an average loss function value of the plurality of training image groups; and adjusting the parameters of the neural network based on the average loss function value.

4. The method according to claim 3, wherein the step of adjusting the parameters of the neural network based on the average loss function value, comprises:

adjusting the parameters of the neural network through a back propagation based on the average loss function value.

5. A neural network training apparatus for image retrieval, wherein a neural network comprises: one feature extractor and a plurality of learners, and the plurality of learners share features extracted by the one feature extractor; the apparatus predetermines a plurality of training image groups, and each training image group comprises three images, wherein two images are of the same category and one image is of a different category; for each training image group, a random weight is assigned to each learner; and the apparatus comprises:

an extracting unit configured for, for each training image group, inputting the three images of the training image group into the feature extractor, and determining features of the three images;

a weighting unit configured for, for each training image group and for each image, respectively multiplying the features of the image by the random weight corresponding to each learner, so as to obtain weighted features of the image corresponding to each learner; and for each learner, making the three images in the training image group correspond to the same random weight;

a mapping unit configured for, for each training image group and for each image, inputting the weighted features of the image corresponding to each learner into the corresponding learner, and determining a plurality of feature vectors of the image; and an adjusting unit configured for adjusting parameters of the neural network based on the plurality of feature vectors of each image in each training image group of the plurality of training image groups;

wherein a different random weight is reassigned to each learner every time when one training image group is changed to another training image group, while the random weight corresponding to each learner remains unchanged in processing the three images of the same training image group.

6. The apparatus according to claim 5, wherein the apparatus predetermines the plurality of training image groups, which comprises that:

the apparatus acquires a training sample set, wherein the training sample set comprises a plurality of categories of images, and each category comprises at least two images; and the apparatus determines a plurality of reference images A, an image P of the same category as each reference image A and an image N of a different category from each reference image A from the training sample set, so as to obtain the plurality of training image groups, wherein each training image group comprises: the reference image A, the image P of the same category and the image N of the different category.

7. The apparatus according to claim 5, wherein the adjusting unit is configured for:

for each image in each training image group, mapping the plurality of feature vectors of the image into an embedded feature vector through a fully connected layer;

for each training image group, calculating a loss function value of the training image group based on three embedded feature vectors corresponding to the three images and categories of the three images;

for the plurality of training image groups, determining an average loss function value of the plurality of training image groups; and adjusting the parameters of the neural network based on the average loss function value.

8. The apparatus according to claim 7, wherein the adjusting unit adjusts the parameters of the neural network based on the average loss function value, which comprises:

adjusting the parameters of the neural network through a back propagation based on the average loss function value.

9. An electronic device, comprising: a processor and a storage;

wherein the processor is configured for executing the steps of the method according to claim 1 by calling a program or an instruction stored in the storage.

10. A non-transitory computer-readable storage medium, wherein the non-transient computer-readable storage medium stores a program or an instruction, and the program or the instruction enables a computer to execute the steps of the method according to claim 1.

11. The electronic device according to claim 9, wherein in the method, the plurality of training image groups are predetermined, which comprises:
   acquiring a training sample set, wherein the training sample set comprises a plurality of categories of images, and each category comprises at least two images; and
   determining a plurality of reference images A, an image P of the same category as each reference image A and an image N of a different category from each reference image A from the training sample set, so as to obtain the plurality of training image groups, wherein each training image group comprises: the reference image A, the image P of the same category and the image N of the different category.

12. The electronic device according to claim 9, wherein in the method, the step of adjusting the parameters of the neural network based on the plurality of feature vectors of each image in each training image group of the plurality of training image groups, comprises:
   for each image in each training image group, mapping the plurality of feature vectors of the image into an embedded feature vector through a fully connected layer;
   for each training image group, calculating a loss function value of the training image group based on three embedded feature vectors corresponding to the three images and categories of the three images;
   for the plurality of training image groups, determining an average loss function value of the plurality of training image groups; and
   adjusting the parameters of the neural network based on the average loss function value.

13. The electronic device according to claim 12, wherein in the method, the step of adjusting the parameters of the neural network based on the average loss function value, comprises:
   adjusting the parameters of the neural network through a back propagation based on the average loss function value.

14. The non-transitory computer-readable storage medium according to claim 10, wherein in the method, the plurality of training image groups are predetermined, which comprises:
   acquiring a training sample set, wherein the training sample set comprises a plurality of categories of images, and each category comprises at least two images; and
   determining a plurality of reference images A, an image P of the same category as each reference image A and an image N of a different category from each reference image A from the training sample set, so as to obtain the plurality of training image groups, wherein each training image group comprises: the reference image A, the image P of the same category and the image N of the different category.

15. The non-transitory computer-readable storage medium according to claim 10, wherein in the method, the step of adjusting the parameters of the neural network based on the plurality of feature vectors of each image in each training image group of the plurality of training image groups, comprises:
   for each image in each training image group, mapping the plurality of feature vectors of the image into an embedded feature vector through a fully connected layer;
   for each training image group, calculating a loss function value of the training image group based on three embedded feature vectors corresponding to the three images and categories of the three images;
   for the plurality of training image groups, determining an average loss function value of the plurality of training image groups; and
   adjusting the parameters of the neural network based on the average loss function value.

16. The non-transitory computer-readable storage medium according to claim 15, wherein in the method, the step of adjusting the parameters of the neural network based on the average loss function value, comprises:
   adjusting the parameters of the neural network through a back propagation based on the average loss function value.

* * * * *